United States Patent
Milford

(10) Patent No.: US 11,546,649 B2
(45) Date of Patent: Jan. 3, 2023

(54) VOD PRODUCT RENDERING CONTROLLER

(71) Applicant: ARRIS Enterprises LLC, Suwanee, GA (US)

(72) Inventor: Matthew A. Milford, Waxhaw, NC (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 16/396,641

(22) Filed: Apr. 27, 2019

(65) Prior Publication Data

US 2019/0364318 A1 Nov. 28, 2019

Related U.S. Application Data

(66) Substitute for application No. 62/665,821, filed on May 2, 2018.

(51) Int. Cl.

| | |
|---|---|
| *H04N 21/2668* | (2011.01) |
| *H04N 21/234* | (2011.01) |
| *H04N 21/433* | (2011.01) |
| *H04N 21/258* | (2011.01) |
| *H04N 21/262* | (2011.01) |
| *H04N 21/81* | (2011.01) |
| *H04N 21/2381* | (2011.01) |
| *H04N 21/2665* | (2011.01) |

(52) U.S. Cl.
CPC ..... *H04N 21/2668* (2013.01); *H04N 21/2381* (2013.01); *H04N 21/23424* (2013.01); *H04N 21/25891* (2013.01); *H04N 21/2665* (2013.01); *H04N 21/26258* (2013.01); *H04N 21/4334* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 8,056,105 B2* | 11/2011 | Liu | H04N 21/4828 725/87 |
| 8,473,996 B2 | 6/2013 | Gordon et al. | |
| 2002/0049977 A1* | 4/2002 | Miller | H04N 21/2402 725/82 |
| 2002/0190876 A1* | 12/2002 | Lai | H04N 19/40 341/50 |

(Continued)

OTHER PUBLICATIONS

Canadian Office Action Re: Application No. 3,042,076.

*Primary Examiner* — Alexander Q Huerta
(74) *Attorney, Agent, or Firm* — Chernoff, Vilhauer, McClung & Stenzel, LLP

(57) ABSTRACT

A product rendering controller (PRC) manages the overall process of creating video-on-demand (VOD) assets or products from source assets that are obtained from a wide variety of different content sources (e.g., web-based sources) and which are in a wide variety of different native media formats. The source assets are converted to video transport streams such as an MPEG transport stream and transcoded as necessary to create the VOD products. The PRC determines the VOD products that need to be generated, pre-caches data that is to be incorporated into VOD products, and selects the pool of video product generators that is to be used to convert the source assets to VOD products.

20 Claims, 4 Drawing Sheets

(56) References Cited

U.S. PATENT DOCUMENTS

| | | | |
|---|---|---|---|
| 2004/0073925 A1* | 4/2004 | Kinoshita | H04N 21/2343 |
| | | | 348/E7.071 |
| 2004/0103120 A1* | 5/2004 | Fickle | G06Q 10/10 |
| 2008/0086752 A1* | 4/2008 | Perez | H04N 21/44224 |
| | | | 348/E7.071 |
| 2009/0133059 A1 | 5/2009 | Gibbs | |
| 2009/0235319 A1* | 9/2009 | Mao | H04N 21/2221 |
| | | | 725/93 |
| 2010/0158109 A1 | 6/2010 | Dahlby | |
| 2012/0137337 A1 | 5/2012 | Sigmon, Jr. | |
| 2013/0097309 A1* | 4/2013 | Ma | H04L 67/2847 |
| | | | 709/224 |
| 2014/0006556 A1* | 1/2014 | Shapiro | H04L 67/04 |
| | | | 709/217 |
| 2014/0109157 A1* | 4/2014 | Kellicker | H04N 21/2358 |
| | | | 725/93 |
| 2014/0143437 A1* | 5/2014 | Mathur | H04N 21/6581 |
| | | | 709/231 |
| 2014/0245356 A1* | 8/2014 | Mukerji | H04N 21/47202 |
| | | | 725/46 |
| 2014/0380398 A1* | 12/2014 | Schaffer | H04N 19/12 |
| | | | 725/118 |
| 2015/0007237 A1* | 1/2015 | Good | H04N 21/234309 |
| | | | 725/92 |
| 2015/0382029 A1* | 12/2015 | Klappert | H04N 21/47202 |
| | | | 725/39 |
| 2016/0191961 A1* | 6/2016 | Fisher | H04N 21/234309 |
| | | | 725/116 |
| 2016/0301957 A1* | 10/2016 | McCarthy | H04N 21/23655 |
| 2017/0055039 A1 | 2/2017 | Earle | |
| 2019/0098065 A1* | 3/2019 | LaPier | H04N 21/2407 |
| 2020/0084482 A1* | 3/2020 | Nielsen | H04N 21/236 |

\* cited by examiner

VOD PRODUCT RENDERING CONTROLLER

CROSS REFERENCE TO RELATED APPLICATION

This application claims priority under 35 U.S.C. § 119(e) from earlier filed U.S. Provisional Application Ser. No. 62/665,821, filed May 2, 2018 which is incorporated herein by reference in its entirety.

BACKGROUND

Subscription based video content service providers employ networks such as direct broadcast satellite (DBS), over-the-air, cable and/or telecommunication distribution systems to distribute video content as linear video or video-on-demand (VOD) streams. Such systems typically transmit content to subscribers in an encoded form as a digital MPEG video stream and each subscriber has a client device such as a set-top box or the like that is capable of decoding the MPEG video stream. Beyond providing linear and video-on-demand (VOD) content, service providers are now interested in providing Internet-based or over-the-top (OTT) content, such as web pages, video games, voice-over-IP (VOIP) telephony services that may include video, still images, data, graphics, interactive media and streaming delivery of audiovisual content including movies, and the like.

As a result of the ever-growing number of content sources that are available, service providers often provide hundreds of different channels for viewers to choose from. Additionally, a vast array of Internet-based sources of content are also available to consumers, including video, still images and graphics. To assist consumers in selecting and receiving the video content that they are most interested in, subscription-based video content service providers would like to offer personalized channels targeted or personalized for individual consumers or groups of consumers that have one or more attributes or characteristics in common. For instance, personalized channels may be targeted to groups of consumers who are physically located in common regional markets.

As the Internet has become more dynamic, including video content on web pages and requiring applications or scripts for decoding the video content, service providers have adapted to allow subscribers the ability to view these dynamic web pages. In order to transmit a dynamic web page to a requesting subscriber in encoded form, the service provider's head end retrieves the requested web page and renders the web page. Thus, the headend must first decode any encoded content that appears within the dynamic webpage. For example, if a video is to be played on the webpage, the headend must retrieve the encoded video and decode each frame of the video. The cable headend then renders each frame to form a sequence of bitmap images of the Internet web page. Thus, the web page can only be composited together if all of the content that forms the web page is first decoded. Once the composite frames are complete, the composited video is sent to an encoder transcoder, such as an MPEG transcoder to be re-encoded. The compressed MPEG video frames are then sent to an ABR packager to create an ABR manifest for the content.

SUMMARY

In accordance with one aspect of the techniques described herein, a method and apparatus is provided for managing a process for converting source assets from a native format to a video transport stream that conforms to a prescribed protocol. In accordance with the method, a request is received for receiving a first video-on-demand (VOD) product in a video transport stream. A video product generator pool is selected from among a plurality of video product generator pools for processing a first source asset from which the first VOD product is to be created. The selection is based at least in part on at least one attribute of the first source asset and at least one characteristic of the selected video product generator pool. The selected video product generator pool is requested to generate the first VOD product from the first source asset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

As previously mentioned, subscription-based video content service providers would like to offer a wide variety of content to consumers, including Internet-based content. Described herein is a product rendering controller (PRC) for managing the overall process of creating VOD assets or products from source assets that are obtained from a wide variety of different content sources and which are in a wide variety of different native media formats. The source assets are converted to video transport streams such as an MPEG transport stream and transcoded as necessary to create the VOD products. The PRC determines the VOD products that need to be generated, pre-caches data that is to be incorporated into VOD products, and selects the pool of video product generators that is to be used to convert the source assets to VOD products.

Figure 1:
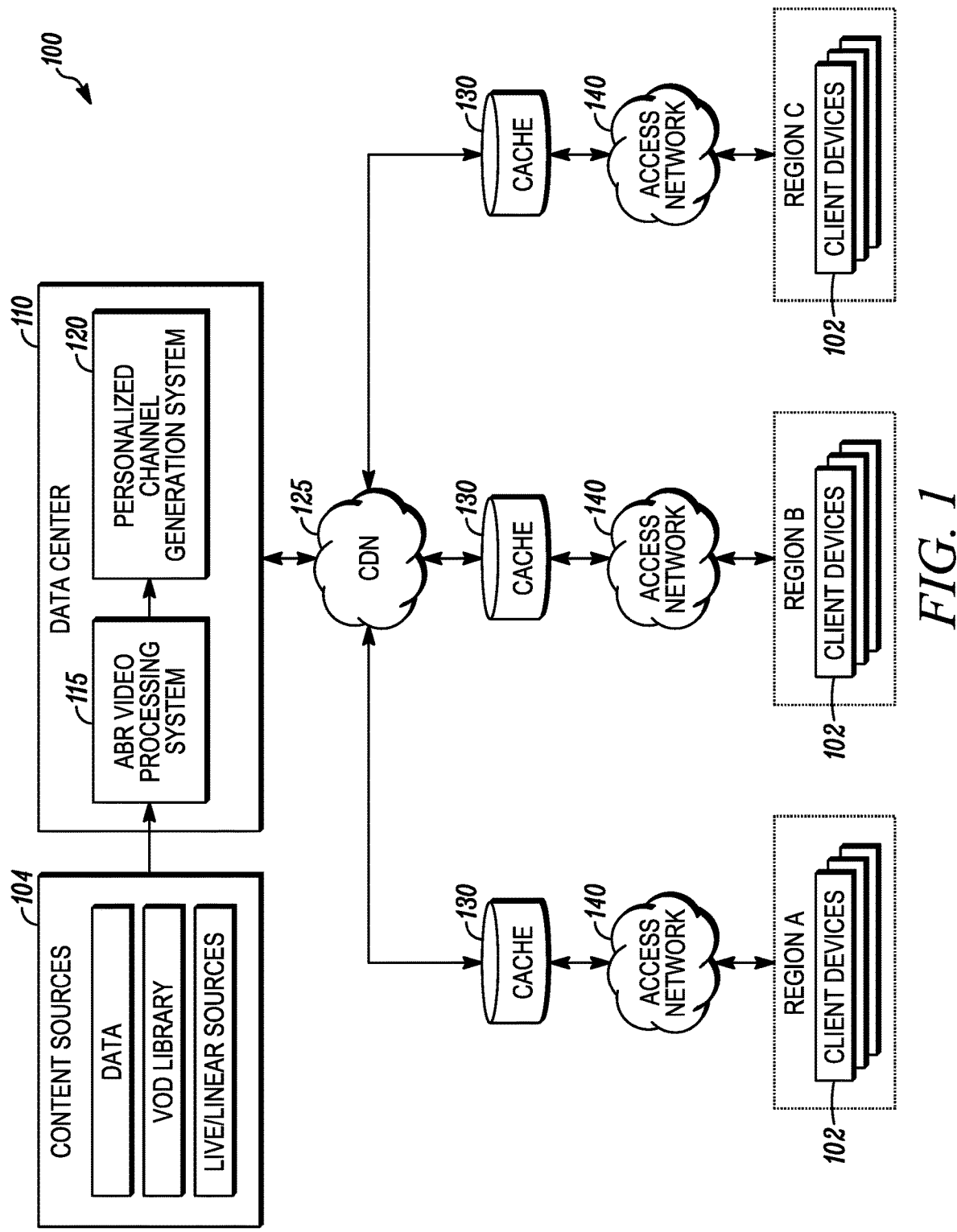
FIG. 1 shows one example of an operating environment in which the techniques, systems and devices described herein may operate.

FIG. 1 shows one example of an operating environment in which the techniques, systems and devices described herein may operate. In particular, FIG. 1 depicts a high-level functional block diagram of a representative adaptive bit rate system 100 that delivers content to adaptive bit rate client devices 102. An adaptive bit rate client device 102 is a client device capable of providing streaming playback by requesting an appropriate series of segments from an adaptive bit rate system. The ABR client devices 102 associated with users or subscribers may include a wide range of devices, including, without limitation, digital televisions, set top boxes (STBs), digital media players, mobile communication devices (e.g., smartphones) video gaming devices, video game consoles, video teleconferencing devices, and the like.

The video products made available by the adaptive bit rate system 100 may originate from various content sources represented by content source 104, which may provide source assets such as data, images, video, graphics, text and the like, which may originate, for instance, from web-based content sources. The source assets are provided to a data center 110 that includes a video processing system 115 and a personalized channel delivery system 120. The video processing system 115 is responsible for ingesting the source assets in their native format (e.g., MPEG, HTML5, JPEG, etc.) and processing them as necessary so that they can be transcoded and packaged. The video processing system 115 also includes the transcoders and packagers that are responsible for preparing individual adaptive bit rate streams. A transcoder/packager is designed to encode, then fragment the media files into chunks or segments and to encapsulate those files in a container expected by the particular type of adaptive bit rate client. The adaptive bit rate segments are available at different bit rates, where the segment boundaries are aligned across the different bit rates so that clients can switch between bit rates seamlessly at the segment boundaries.

Along with the delivery of media, the packagers create the manifest files for each type of adaptive bit rate streaming protocol that is employed. In adaptive bit rate protocols, the manifest files generated may include a main or variant manifest and a profile or playlist manifest. The main manifest describes the various formats (resolution, bit rate, codec, etc.) that are available for a given asset or content stream. For each format, a corresponding profile manifest may be provided. The profile manifest identifies the media file chunks/segments that are available to the client. The ABR client determines which format the client desires, as listed in the main manifest, finds the corresponding profile manifest and location, and then retrieves media segments referenced in the profile manifest.

The individual adaptive bit rate streams are typically posted to an HTTP origin server (not shown) or the like so that they can be accessed by the client devices 102 over a suitable content delivery network (CDN) 125, which may be in communication with various edge caches 130. In some cases the edge caches 130 are in turn in communication with one or more client devices 102 in one or more regions through one or more access networks 140 that each serve a designated region. By way of a non-limiting example, FIG. 1 depicts an example of the data center 110 in communication with three regions A, B and C. However, the central data center 110 can be in communication with any desired number of regions. CDN 125 and access networks 140 may comprise any suitable network or combination of networks including, without limitation, IP networks, hybrid fiber-coax (HFC) networks, and the like.

It should be noted that the various systems and components of the adaptive bit rate system 100 shown in FIG. 1 may be in any suitable location or locations. To the extent they are not co-located, they may communicate over one or more networks such as an IP CDN.

The various manifests that have been generated by the video processing system 115 are provided to the personalized channel generation system 120, which creates the personalized channels based on such factors as individual profiles of subscribers' interests, preferences and specific content selections, subscriber geographical locations, and/or genres of content. For instance, by way of example, personalized channels may be created for all subscribers in particular cities or other market regions, other personalized channels may be created for individual subscribers, and yet other personalized channels may be created for subscribers who, by way of example, are fans of certain genres (e.g., science fiction, westerns) of movies or who are located in a particular region and are interested in local sports events occurring in that region.

The personalized channel generation system 120 selects the video products and events that are to be included in the video stream for each personalized channel and obtains, for each video product and event, its corresponding manifest. The personalized channel generation system 120 then assembles the manifest for each channel into a rolling manifest that can be delivered to the ABR client device(s) that are to receive that personalized channel.

Figure 2:
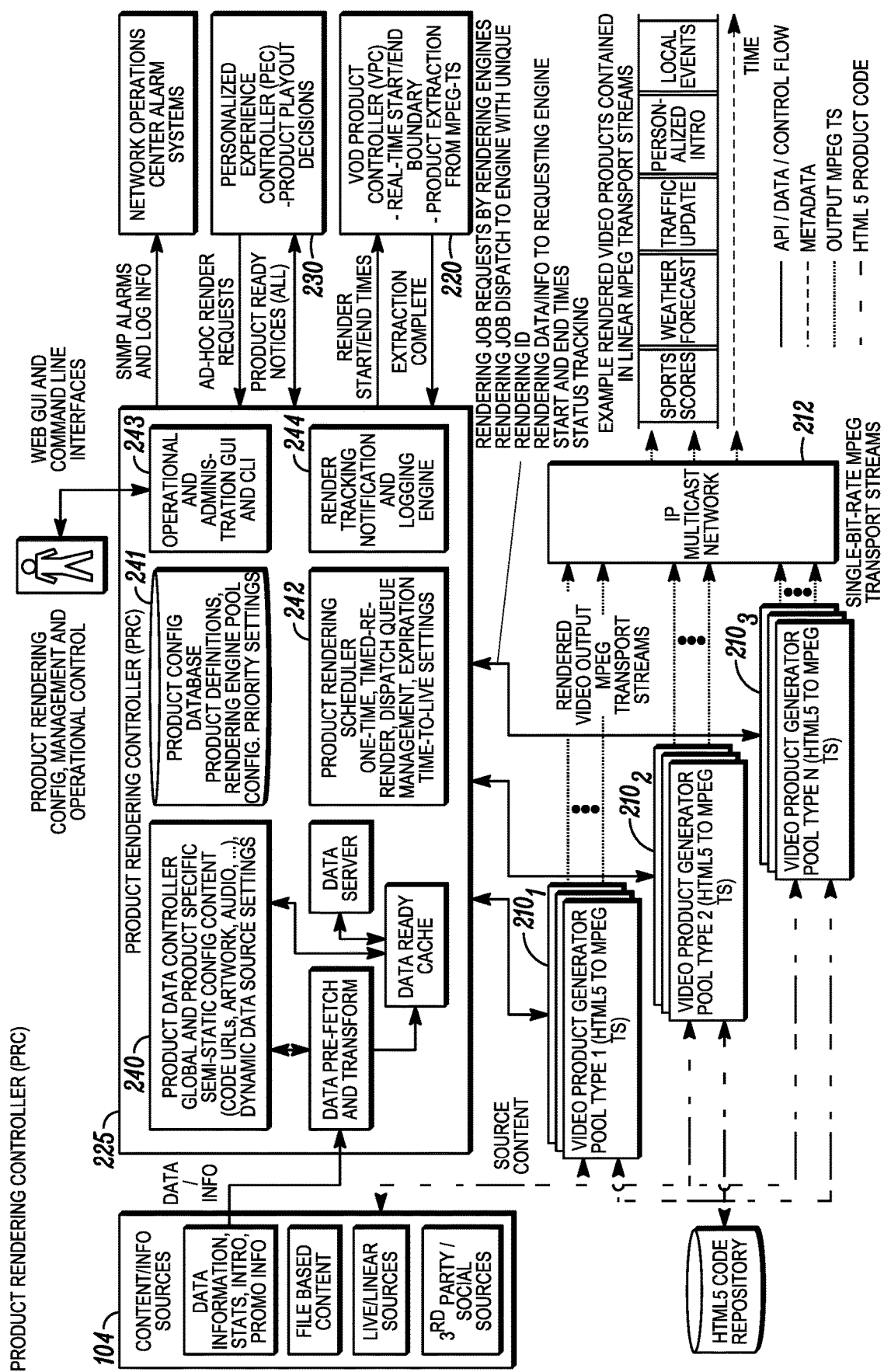
FIG. 2 shows one example of the components of the adaptive bit rate (ABR) video processing system pertinent to a description of the product rendering controller (PRC).

FIG. 2 shows one example of the components of the ABR video processing system 115 pertinent to a description of the PRC. In this example the video processing system 115 includes a series of video product generator pools $210_1$, $210_2$ and $210_3$ ("210"). The video product generators in the pools $210_1$, $210_2$ and $210_3$ ingest a wide variety of different types of source assets from content sources 104 in different native media formats, including Internet- or web-based content such as discussed above, and converts it into an MPEG or other type of video transport stream. While the example in FIG. 2 shows three video product generator pools 210, more generally any number of pools may be employed, each having any suitable number of individual video product generators. One example of a suitable video product generator is the CloudTV StreamCast™ product available from ActiveVideo®.

The MPEG transport streams produced by the video product generators can be communicated over a network such as IP multicast network 212 to transcoders and ABR packagers (not shown), which transcode and package the transport streams to prepare the individual ABR streams so that they can be delivered to the ABR client devices as a VOD asset or product.

The video processing system 115 also includes the product rendering controller (PRC) 225, which as previously mentioned controls the overall process of creating video assets or products from source assets that are obtained from different content sources and which are in a different native media formats. In one embodiment the PRC 225 includes a number of functional modules or components such as, in the example of FIG. 2, product data controller 240, product configuration database 241, product rendering scheduler 242, operational and administration system 243 and render tracking system 244.

One function of the PRC 225 is to define the various types of source assets that are to be converted to a video transport stream such as an MPEG video transport stream and determine the particular video product generator pool $210_1$, $210_2$, $210_3$ that is to process each source asset based on its content type. The different content types that are defined relate to the nature and complexity of the video product creation process that will be needed to transform the source assets into the desired video transport stream. For instance, different illustrative content types may include, by way of example only, web-originating products, traffic information products, weather forecast product, radar map products, data products, and so on. Some types of video product generators may have capabilities better suited to processing certain types of source assets than other types of video product generators.

For example, a complex graphical image (e.g., a weather map) or rapidly moving video may be more suitable for processing by a pool of video product generators in which the individual video product generators have specialized computing hardware such as graphical processing units, whereas for a source asset that only includes data it may be sufficient to use a pool of video product generators in which the individual video product generators are less specialized and have more generic computer processing units. As another example, higher resolution video content (e.g., full high-definition) may be better suited to video product generators that have faster processors while video products that have slower processes may be sufficient for processing lower resolution video content (e.g., 720P). Accordingly, the PRC 225 will match the content type to the capabilities of the pool of video product generators. The definitions of the various content types and the particular video product generator pools that should be used for each content type may be established, for example, by the product data controller 240 under operator instructions received via the operational and administration system 243. The content type definitions and the identity of the video product generators pools suitable for processing each of those content types may be stored in the product configuration database 241.

The PRC 225 may also define global configuration settings or parameters and product specific settings or parameters. Global settings may include values for any parameters that are applicable to more than one individual video product. For instance, the value of one global setting may specify the amount of time weather radar maps should be shown or the amount of time video from a traffic camera should be shown. On the other hand, product specific settings are generally applicable to a single video product. For instance, a source asset that provides a video from a particular traffic camera in a specific city may have a product specific setting that specifies the network location (e.g., a URL) for the traffic camera. These configuration settings may be stored, for example, in the product configuration database 241.

The PRC 225 may also pre-fetch and cache from the content sources 104 select data or other source assets that are to be transformed into or otherwise incorporated in the video products produced by the video product generators. In this way the data will be immediately available for serving by the PRC 225 when needed by the video product generators, thereby reducing delays. Some data or other source assets that need to be regularly updated such as weather, traffic or news reports may be scheduled for polling by the PRC 225 at regular intervals of time (e.g., every 15 minutes for weather, every 30 minutes for traffic, every 4 hours for national news). In the particular example shown in FIG. 2, the pre-fetching and caching may be performed under the control of the product data controller 240 and the polling intervals may be established by the rendering scheduler 242 via operator instructions received via the operational and administrative system 243.

In addition to scheduling in advance source assets for processing by the video product generators, the PRC 225 may receive requests for content from a component or system in the personalized channel delivery system 120 such as the personalized experience controller (PEC) 230 depicted in FIG. 2. These requests may be received on an ad hoc or some other basis such as a prioritized, on-demand basis.

In addition to determining the particular pool of video product generators to which various content types are to be dispatched, the PRC 225 may also prioritize the processing of the source assets. That is, some content requests, including those that have been previously scheduled and those received from the PEC 230, may be given priority over other content requests. This may be necessary, for instance, when the PRC 225 receives an ad hoc request for content from the PEC 230 or when not all the video product generators are available, thus causing processing delays since all the source assets that would normally be processed at a particular time cannot be processed.

Other functions that may be performed by the PRC 22.5 include tracking the overall video product generation process from start to finish and while in-progress and indicating whether the process completed successfully, or, if not, indicating that error(s) were encountered. Likewise, the PRC 225 may notify other systems and components when the video product generation process starts and completes. Such systems and components that may be notified include the video product controller (VPC) 220, which oversees the transcoding and ABR packaging process once the video product generation process is complete, and one or more of those components Or systems in the personalized channel delivery system 120 such as the personalized experience controller (PEC) 230 depicted in. FIG. 2. In the example shown in FIG. 2 the tracking and notifying may be performed by the rendering tracking system 244.

Yet other functions that may be performed by the PRC 225 include assigning validity periods and time-to-live values to video products produced by the video product generators. Validity periods may be assigned to select categories of VOD products (e.g., weather, news, traffic, etc.) and time-to-live periods may be assigned to specific VOD products in those categories when the VOD products are delivered to a content delivery network. The PRC 225 may also manage the versions and unique identifiers for the video products and manage the progress of product refreshes over time.

Figure 3:
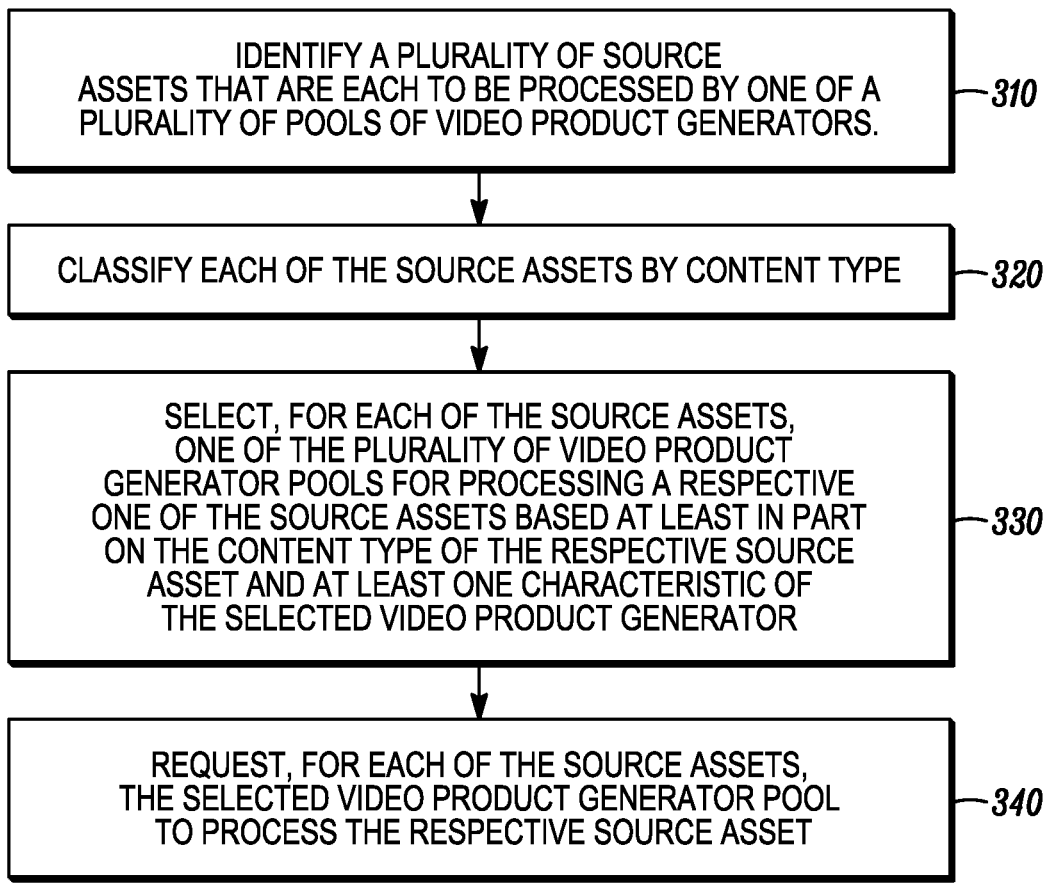
FIG. 3 is a flowchart showing one example of a method of managing a process for converting source assets from a native format to a video transport stream that conforms to a prescribed protocol.

FIG. 3 is a flowchart showing one example of a method of managing a process for converting source assets from a native format to a video transport stream that conforms to a prescribed protocol. At block 310 a plurality of source assets is identified that are each to be processed by one of a plurality of pools of video product generators. At block 320 each of the source assets are classified by content type. The content types are defined by the nature and complexity of the video product generation process that will be needed to transform the source assets. For each of the source assets, one of the plurality of video product generators pools are selected at block 330 for processing a respective one of the source assets based at: least in part: on the content type (and/or other attributes) of the respective source asset and at least one characteristic of the selected video product generator pool. The characteristic of the selected video product generator pool may be, for instance, the processing capability of the video product generators in the selected pool. For each of the source assets, the selected video product generator pool is requested to process the respective source asset at block 340.

Figure 4:
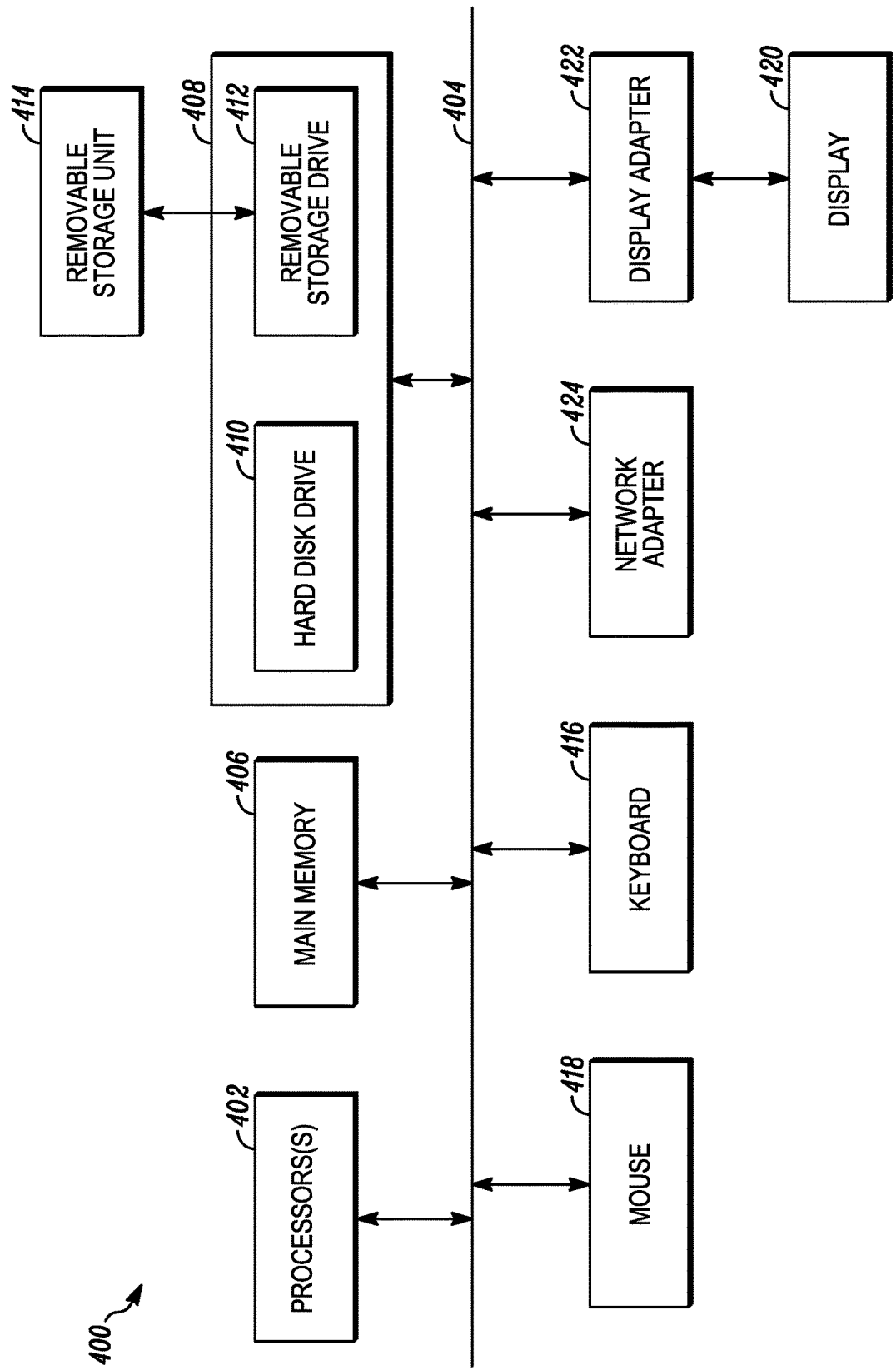
FIG. 4 illustrates a block diagram of one example of a computing apparatus 400 that may be configured to implement or execute one or more of the processes performed by any of the various devices shown herein, including but not limited to the PRC.

FIG. 4 illustrates a block diagram of one example of a computing apparatus 400 that may be configured to implement or execute one or more of the processes performed by any of the various devices shown herein, including but not limited to the PRC 225. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, where a copy of the program code for one or more of the processes described herein may be stored. The removable storage drive 412 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet. LAN, etc., through a network adaptor 624.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between to or more computers. All functions performed by the various components, modules, engines, systems, apparatus, interfaces or the like may be collectively performed by a single processor or each component, module, engine, system, apparatus, interface or the like may have a separate processor.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein may be combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method of managing a process for converting a source asset from a native format to a particular destination format in a video transport stream that conforms to a prescribed video coding protocol for encoding a plurality of frames of video, the method comprising:
    identifying a plurality of source assets that are each to be processed by a respective pool of video product generators that create sequential video frames of video products in a video transport stream from source video frames of the source assets, each respective pool capable of converting a source asset from its native format to the particular destination format;
    for each of the content assets, selecting one of the plurality pools for processing a respective one of the source assets based at least in part on at least one format-independent image attribute of the respective source asset and at least one characteristic of the selected video product generator pool; and
    for each of the source assets, requesting the selected video product generator pool to generate the respective video transport streams.

2. The method of claim 1, further comprising classifying each of the source assets by a content type, wherein the at least one attribute of each of the source assets corresponds to the content type, the content types being defined by a nature and complexity of the process that will be needed to transform the source assets into video transport streams.

3. The method of claim 2, wherein selecting one of the plurality of video product generator pools includes, for each of the source assets, selecting a video product generator pool based on the content type of the respective source asset.

4. The method of claim 3, wherein selecting a video product generator pool based on the content type of the respective source asset includes selecting a video product generator pool that has a processing capability that best matches the content type of the respective source asset.

5. The method of claim 1, wherein the at least one characteristic of the selected video product generator includes a processing capability of the selected video product generator.

6. The method of claim 1, further comprising causing pre-established values for global and source asset specific parameters to be applied during processing of the source assets by the video product generators.

7. The method of claim 1, further comprising pre-fetching and caching selected source assets and communicating the selected source assets to the video product generator pools that are to respectively process the selected source assets when the selected source assets are to be processed so that processing delays are avoided.

8. The method of claim 7, further comprising scheduling the pre-fetching and caching of selected source assets at specified periodic intervals to thereby regularly update the selected source assets.

9. The method of claim 8, wherein the specified periodic intervals are different for different selected source assets.

10. The method of claim 1, wherein identifying the plurality of source assets to be processed includes receiving a prioritized on-demand request for generating one or more video products from a system that delivers personalized channels to client devices.

11. The method of claim 1, further comprising assigning expiration times and time-to-live values to selected video products.

12. The method of claim 1, further comprising prioritizing processing by the video product generator pools of selected source assets over other source assets.

13. The method of claim 1, wherein the video transport stream is an MPEG video transport stream.

14. An apparatus comprising:
at least one processor;
at least one memory operatively coupled to the at least one processor;
computer program code resident in storage and loadable into said memory, so as to cause said at least one processor to:
receive a request to receive a first VOD product in a video transport stream in a particular output video format;
select a video product generator pool from among a plurality of different video product generator pools, each differently configured relative to one another for processing a first source asset from which the first VOD product is to be transcoded from a particular source format into the particular output video format comprising an encoded plurality of frames of video conforming to a prescribed video coding protocol, wherein the selection is based at least in part on at least one format-independent attribute of the first source asset and at least one characteristic of the selected video product generator pool; and
request that the selected video product generator pool process the first source asset to create the first VOD product.

15. The apparatus of claim 14, wherein the computer program code, when loaded into said memory, causes said at least one processor to:
receive a request to receive a second VOD product in a video transport stream;
select a second video product generator pool from among one of the plurality of video product generator pools for processing a second source asset from which the second VOD product is to be created, wherein the selection is based at least in part on at least one attribute of the second source asset and at least one characteristic of the selected video product generator pool; and
request that the second video product generator pool process the second source asset to create the second VOD product.

16. The apparatus of claim 14, wherein the computer program code, when loaded into said memory, causes said at least one processor to classify first source asset by content type, wherein the at least one attribute of the source assets corresponds to the content type, the content type being defined by a nature and complexity of the process that will be needed to transform the first source assets into a video transport stream.

17. The apparatus of claim 16, wherein the at least one characteristic of the selected video product generator includes a processing capability of the selected video product generator.

18. The apparatus of claim 16, wherein the computer program code, when loaded into said memory, causes said at least one processor to select a video product generator pool based on the content type of the first source asset.

19. The apparatus of claim 18, wherein the computer program code, when loaded into said memory, causes said at least one processor select a video product generator pool that has a processing capability that best matches the content type of the first source asset.

20. The method of claim 14, wherein the computer program code, when loaded into said memory, causes said at least one processor to cause pre-established values for global and source asset specific parameters to be applied during processing of the first source asset by the selected video product generator pool.

* * * * *